US008340060B2

(12) United States Patent
Sahin et al.

(10) Patent No.: US 8,340,060 B2
(45) Date of Patent: Dec. 25, 2012

(54) OFDMA-BASED CO-CHANNEL FEMTOCELL

(75) Inventors: Mustafa Emin Sahin, Tampa, FL (US);
Huseyin Arslan, Tampa, FL (US);
Ismail Guvenc, Santa Clara, CA (US);
Moo Ryong Jeong, Saratoga, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1048 days.

(21) Appl. No.: 12/333,138

(22) Filed: Dec. 11, 2008

(65) Prior Publication Data
US 2009/0221295 A1 Sep. 3, 2009

Related U.S. Application Data

(60) Provisional application No. 61/033,380, filed on Mar. 3, 2008, provisional application No. 61/093,206, filed on Aug. 29, 2008.

(51) Int. Cl.
*H04W 4/00* (2009.01)
(52) U.S. Cl. ........................................................ 370/338
(58) Field of Classification Search .................. 370/338
See application file for complete search history.

(56) References Cited

U.S. PATENT DOCUMENTS

| 6,041,237 | A  | * | 3/2000 | Farsakh ........................... 455/450 |
| 6,225,948 | B1 |   | 5/2001 | Baier et al. |
| 7,610,036 | B2 | * | 10/2009 | Teo et al. ........................ 455/403 |
| 8,031,662 | B2 | * | 10/2011 | Lee et al. ........................ 370/329 |
| 2006/0280116 | A1 |   | 12/2006 | Ji et al. |
| 2007/0032254 | A1 | * | 2/2007 | Chen ............................... 455/509 |
| 2007/0097938 | A1 |   | 5/2007 | Nylander et al. |
| 2007/0211757 | A1 |   | 9/2007 | Oyman |
| 2007/0248173 | A1 |   | 10/2007 | Hassan et al. |
| 2007/0254620 | A1 |   | 11/2007 | Lindquist et al. |
| 2008/0002658 | A1 |   | 1/2008 | Soliman |
| 2008/0049709 | A1 |   | 2/2008 | Pan et al. |
| 2008/0108365 | A1 | * | 5/2008 | Buddhikot et al. ............ 455/452.1 |
| 2008/0232487 | A1 | * | 9/2008 | Cleveland et al. .............. 375/260 |
| 2009/0135744 | A1 | * | 5/2009 | Chaudhri et al. ............... 370/278 |
| 2009/0190500 | A1 | * | 7/2009 | Ji et al. ........................... 370/254 |

FOREIGN PATENT DOCUMENTS
WO WO 2007/139460 12/2007

OTHER PUBLICATIONS

Partho Choudhury and Deepak Dahuja, "UMA and Femtocells: Making FMC Happen", *White Paper*, Dec. 2007. [Online] Available: http://www.parthochoudhury.com/UMAFemto.doc.

(Continued)

*Primary Examiner* — Mark Rinehart
*Assistant Examiner* — Angel Brockman
(74) *Attorney, Agent, or Firm* — Haynes & Boone, LLP

(57) ABSTRACT

A femtocell increases efficiency and coverage of a macrocellular network operating in a co-channel manner within the macrocell spectrum by selecting subcarriers for its mobile station using both the subcarrier allocation map received from the macrocell and a spectrum sensing operation. Interference is avoided by selecting only subcarriers not allocated by the macrocell and subcarriers allocated to users not nearby to the femtocell. Interference is eliminated from the received signals using co-channel interference avoidance techniques. Selection of subcarriers for femtocell use may take into consideration inter-carrier interference detected.

18 Claims, 8 Drawing Sheets

OTHER PUBLICATIONS

Airvana Inc., "Femto Cells: Personal Base Stations", *White Paper*, 2007. [Online] Available: http://www.airvana.com/files/Femto_Overview_Whitepaper_FINAL_12-July-07.pdf.

PicoChip Designs Ltd., "The Case for Home Base Stations," *White Paper*, Apr. 2007. [Online] Available: http://www.picochip.com/downloads/27c85684cd0d348edcffe7413f6ff79/femtocell_wp.pdf.

Vikram Chandrasekhar and Jeffrey G. Andrews, "Uplink Capacity and Interference Avoidance for Two-Tier Cellular Networks," *in Proc. IEEE Global Telecommunications Conference (GLOBECOM)*, pp. 3322-3326, Nov. 2007.

Lester T. W. Ho and Holger Claussen, "Effects of User-Deployed, Co-Channel Femtocells on the Call Drop Probability in a Residential Scenario," *in Proc. of IEEE Int. Symp. on Personal, Indoor and Mobile Radio Communications (PIMRC)*, pp. 1-5, Sep. 2007.

Holger Claussen, "Performance of Macro- and Co-Channel Femtocells in a Hierarchical Cell Structure," *in Proc. of IEEE Int. Symp. on Personal, Indoor and Mobile Radio Communications (PIMRC)*, pp. 1-5, Sep. 2007.

Sheng-Yuan Tu, Kwang-Cheng Chen, and Ramjee Prasad, "Spectrum Sensing of OFDMA Systems for Cognitive Radios", in Proc. IEEE Int. Symp. On Personal, Indoor, and Mobile Radio Communications (PIPMRC), 2007.

Nilesh Khambekar, Liang Dong, and VipinChaudhary, "Utilizing OFDM Guard Interval for Spectrum Sensing", in Proc. IEEE Int. Symp. On Personal, Indoor, and Mobile Radio Communications (PIPMRC), 2007.

Ghurumuruhan Ganesan and Ye (Geoffrey) Li, "Cooperative Spectrum Sensing in Cognitive Radio, Part I: Two User Networks", IEEE Trans. Wireless Communications, vol. 6, No. 6, pp. 2204-2213, Jun. 2007.

Ghurumuruhan Ganesan and Ye (Geoffrey) Li, "Cooperative Spectrum Sensing in Cognitive Radio, Part II: Multiuser Networks", IEEE Trans. Wireless Communications, vol. 6, No. 6, pp. 2214-2222, Jun. 2007.

F. S. Chu and K. C. Chen, "Radio Resource Allocation in OFDMA Cognitive Radio Systems," in Proc. IEEE Personal, Indoor and Mobile Radio Commun. (PIMRC), pp. 1-5, Sep. 2007.

T. H. Kim and T. J. Lee, "Spectrum Allocation Algorithms for Uplink Sub-carriers in OFDMA-Based Cognitive Radio Networks," in Proc. IEEE Int. Conf. on Innovations in Information Technol., pp. 51-54, Nov. 2007.

PCT International Search Report for International Application No. PCT/US2009/067172 dated Feb. 4, 2010, 3 pages.

PCT Written Opinion of the International Application No. PCT/US2009/067172 dated Feb. 4, 2010, 3 pages.

PCT International Search Report for International Application No. PCT/US2009/035716 dated Apr. 29, 2009, 2 pages.

PCT Written Opinion of the International Searching Authority for International Application No. PCT/US2009/035716 dated Apr. 29, 2009, 5 pages.

\* cited by examiner

OFDMA-BASED CO-CHANNEL FEMTOCELL

CROSS REFERENCE TO RELATED APPLICATIONS

The present application is related to and claims priority of U.S. provisional patent applications ("Provisional Applications"): (a) Ser. No. 61/033,380, entitled "OFDMA-Based Co-Channel FemtoCell," filed on Mar. 3, 2008; and (b) Ser. No. 61/093,206, entitled "Method for Jointly Utilizing Spectrum Sensing and Scheduling Information for FemtoCell," filed on Aug. 29, 2008. The disclosures of the Copending Provisional Patent Applications are hereby incorporated by reference in their entireties.

BACKGROUND OF THE INVENTION

1. Field of the Invention

The present invention relates to wireless communications. More specifically, the present invention relates to a system which enables a secondary network that uses OFDMA-based femtocell communication to coexist with a macro cellular network using the same spectrum.

2. Discussion of the Related Art

Mobile telephones are essential components that enable today's ubiquitous communication capability. Mobile telephones, which operate inside the coverage areas of service providers or operators, are becoming alternatives to fixed or "land-line" telephones. Recent trends of mobile phone usage are discussed, for example, in the article, entitled "UMA and Femtocells: Making FMC Happen" ("Choudhury"), by Partho Choudhury and Deepak Dahuja, published on-line as a White Paper, December 2007. Choudhury discloses that (a) approximately 30-35% of all voice calls are made over a mobile network are initiated by the subscribers at their homes, and (b) in 2006, about 35% of video streaming and broadcasting services over cellular wireless networks are received while the mobile users are at their homes.

The mobile telephones are becoming an individual's only telephone. Furthermore, mobile users that are under the age of 24 make up to 80% of their long distance calls on wireless networks, rather than wired networks. This statistic is reported in "Femto Cells: Personal Base Stations" ("Airvana"), Airvana Inc., White Paper, 2007. However, the reliability, voice quality and cost of today's mobile telephone networks in indoor environments are not at a desirable level. Typically, indoor mobile telephone service is costly, with many dead spots and poor coverage, resulting in poor customer experience, so that the mobile telephone cannot truly be the only telephone the subscribers need.

Recently, a new class of base stations designed for indoor and personal use is described in both Choudhury and Airvana above, and in "The Case for Home Base Stations" ("PicoChip") PicoChip Designs Ltd., White Paper, April 2007. The cells using these indoor, personal base stations are referred to as "femtocells", and they enable indoor connectivity through existing broadband Internet connections. Femtocells are also considered as one of the options for fixed-mobile convergence (FMC), where the subscribers can switch an active data call session between fixed wireless network (e.g., a wireless local area network (WLAN)) and mobile network (e.g., a cellular network) (See, e.g., Choudhury, discussed above). As discussed in Choudhury, Airvana and PicoChip above, the benefits of femtocells include (a) improved indoor coverage, (b) reduced capital and operational expenditures, (c) reduced bandwidth load, (d) reduced power requirement, (e) additional high-end revenue streams, (f) improved customer royalty, (g) increase in the average revenue per user, (h) compatibility with existing handsets, and no requirement of dual-mode terminals, (i) deployment in operator-owned spectrum, and (j) enhanced emergency services (since the femtocells will know their locations).

While the femtocell promises many benefits, the technology is still at its infancy, with many technical issues still to be solved. One problem impeding femtocells from practical deployment is radio interference management (i.e., interferences between a macro-cellular network ("macrocell") and the femtocell, and between femtocells), which must be minimized. Moreover, there are still many open issues related to how to handle hand-offs between a macrocell and a femtocell, security aspects, scalability problems and access control. See, e.g., the discussions in Airvana.

The literature that addresses these personal base station problems is limited, and is typically only applicable to code division multiple access (CDMA) based technologies. However, next-generation wireless systems (e.g., Long Term Evolution (LTE) and IMT-Advanced systems) are likely to use a frequency division multiple access technology, such as orthogonal frequency division multiple-access (OFDMA) and single-carrier frequency division multiple access (SC-FDMA). Hence, the femtocells in future wireless networks are likely to use OFDMA or SC-FDMA technology, which has a different set of problems, as compared to CDMA networks. In particular, interference management and coexistence between the OFDMA-based (or SC-FDMA-based) macrocell network and the femtocell network are challenging issues that require careful design.

Further, a generic model and framework for a femtocell coexisting with a macrocell network is not available in the literature. The uplink (UL) capacity of a femtocell network that coexists with a macrocell network (i.e., a shared-spectrum network) is derived and analyzed in the article "Uplink Capacity and Interference Avoidance for Two-Tier Cellular Networks" ("Chandrasekhar"), by Vikram Chandrasekhar and Jeffrey G. Andrews, in *Proc. IEEE Global Telecommunications Conference (GLOBECOM)*, pp. 3322-3326, November 2007. In a split spectrum network, the femtocell users and the macrocell users are assigned sub-channels that are orthogonal to each other. While such a division avoids interference between the macrocell and the different femtocells, the total number of users that can be supported is diminished, especially when a large number of femtocells are provided within a macrocell. For a shared spectrum network, a femtocell may utilize some sub-channels that are also utilized by the macrocell, so long as there is limited interference between the two networks. To improve the outage probability, Chandrasekhar proposes using interference avoidance methods. In particular, the macrocell and each femtocell may use time-hopping to decrease the interference. Further, a sectored antenna may be used to provide reception for both the macrocell and femtocell, so as to achieve better capacity. Through interference avoidance (time-hopped CDMA and sectorized antennas), analytical and simulation results show that a femtocell base station (BS) density which is up to seven times higher than without interference avoidance (e.g., relative to a split spectrum network with omnidirectional femtocell antennas) can be supported.

The article, entitled "Effects of User-Deployed, Co-Channel Femtocells on the Call Drop Probability in a Residential Scenario" ("Ho"), by Lester T. W. Ho and Holger Claussen, published in *Proc. of IEEE Int. Symp. on Personal, Indoor and Mobile Radio Communications (PIMRC)*, pp. 1-5, September 2007, analyses femtocells and handover probabilities for different power configurations at a femtocell. Since manual cell planning used in macrocell networks is not practicable for femtocells (i.e., not economical), femtocells typically require auto-configuration capabilities, such as femtocell power and cell size auto-configuration. Using simulations, Ho shows that call-drop probabilities in a residential co-channel femtocell deployment can be significantly decreased through simple pilot power adaptation mechanisms.

The article "Performance of Macro- and Co-Channel Femtocells in a Hierarchical Cell Structure" ("Claussen"), by Holger Claussen, published in *Proc. of IEEE Int. Symp. on Personal, Indoor and Mobile Radio Communications* (*PIMRC*), pp. 1-5, September 2007, discloses a simple power control algorithm for pilots and data in a femtocell. Simulation results show that the interference with the macrocell network can be minimized using such a power control algorithm.

Detection of subcarriers that are already being used is a critical component in an OFDMA-based femtocell. By sensing the subcarriers that are being used by the macrocell network, a femtocell can avoid using these subcarriers. Note that these detected subcarriers may be used by users who are sufficiently far away from the femtocell to allow usage by the femtocell. A challenge in detecting such subcarriers is the lack of time or frequency synchronization between the signals arriving from different macrocell mobile stations (mMSs) at the femtocell BS (fBS). Therefore, the fBS must detect the used subcarriers by spectrum sensing, without time or frequency synchronization. Spectrum sensing is discussed in the following references:

(a). Sheng-Yuan Tu, Kwang-Cheng Chen, and Ramjee Prasad, "Spectrum Sensing of OFDMA Systems for Cognitive Radios" ("Tu"), in Proc. IEEE Int. Symp. On Personal, Indoor, and Mobile Radio Communications (PIMRC), 2007.

(b). Nilesh Khambekar, Liang Dong, and VipinChaudhary, "Utilizing OFDM Guard Interval for Spectrum Sensing" ("Khambekar"), in Proc. IEEE Int. Symp. On Personal, Indoor, and Mobile Radio Communications (PIMRC), 2007.

(c) Ghurumuruhan Ganesan and Ye (Geoffrey) Li, "Cooperative Spectrum Sensing in Cognitive Radio, Part I: Two User Networks" ("Ganesan I"), IEEE Trans. Wireless Communications, vol. 6, no. 6, pp. 2204-2213, June 2007.

(d) Ghurumuruhan Ganesan and Ye (Geoffrey) Li, "Cooperative Spectrum Sensing in Cognitive Radio, Part II: Multiuser Networks" ("Ganesan II"), IEEE Trans. Wireless Communications, vol. 6, no. 6, pp. 2214-2222, June 2007.

(e) F. S. Chu and K. C. Chen, "Radio Resource Allocation in OFDMA Cognitive Radio Systems" ("Chu"), in Proc. IEEE Personal, Indoor and Mobile Radio Commun. (PIMRC), pp. 1-5, September 2007.

(f) T. H. Kim and T. J. Lee, "Spectrum Allocation Algorithms for Uplink Sub-carriers in OFDMA-Based Cognitive Radio Networks" ("Kim"), in Proc. IEEE Int. Conf. on Innovations in Information Technol., pp 51-54, November 2007.

In Tu, the Lloyd-Max algorithm is used for channel identification in a cognitive radio system, and a two-dimensional resource allocation algorithm is disclosed. Khambekar discloses spectrum allocation algorithms for uplink subcarriers in OFDMA-based cognitive radios. In Khambekar, subcarriers that are detected unused by the primary network are assigned to a secondary network based on carrier to interference plus noise ratio (CINR) and throughput considerations. For subcarriers that are used by the primary network, the ones that yield the lowest interference to the primary network, or the ones that have the largest CINR are assigned to the secondary MS. Tu and Khambekar, however, do not address issues that are uniquely related to OFDMA systems and femtocells, such as considerations of time or frequency asynchronization, or utilization of scheduling information from the macrocell BS.

The cognitive radio algorithms which are applicable to femtocells do not take advantage of any collaboration between the primary system (i.e., the macrocells) and the secondary system (i.e., the femtocells), such as providing the frequency allocation maps from the primary system. Instead, the femtocells are required to avoid all the frequency bands that appear "occupied" regardless of the level of risk of posed to the primary users at their respective locations. Hence, very limited portions of the spectrum are available to secondary networks. Since such cognitive radio algorithms require perfect avoidance of co-channel interference, cancelling the co-channel interference caused by primary systems is not developed in the cognitive radio algorithm context.

Nylander, Linqvist and Vikberg disclose new development in femtocell systems in the following works:

(a) T. Nylander, J. Vikberg, P. M. Teder, "Access Control in Radio Access Network Having Pico Base Stations" ("Nylander"), U.S. Patent Application Publication, U.S. 2007/0183427, filed Oct. 3, 2006.

(b) Thomas Lars Erik Lindqvist, Tomas Nylander, and Jari Tapio Vikberg, "Dynamic Building of Monitored Set" ("Lindqvist"), U.S. Patent Application Publication U.S. 2007/0254620, filed Apr. 28, 2006.

(c) Jari Vikberg and T. Nylander, "Method and Apparatus for Remote Monitoring of Femto Radio Base Stations" ("Vikberg"), Application Number: WO2007/0139460, published Dec. 6, 2007.

However, none of these disclosures addresses coexistence issues among femtocells and macrocells in an OFDMA-based system.

SUMMARY

Femtocells are developed to increase the efficiency and coverage of macrocell networks. However, femtocells are advantageous only if they can be operated in a co-channel manner within the macrocell spectrum. A femtocell may increase efficiency and coverage of a macrocellular network operating in a co-channel manner within the macrocell spectrum, and by selecting subcarriers for its mobile station using both the subcarrier allocation map received from the macrocell and a spectrum sensing operation. Interference is avoided by selecting only the subcarriers not allocated by the macrocell and subcarriers allocated to users not nearby to the femtocell. Interference is eliminated from the received signals using co-channel interference avoidance techniques. Selection of subcarriers for femtocell use may take into consideration inter-carrier interference detected.

According to one embodiment of the present invention, a complete system solution for the implementation of OFDMA based co-channel femtocells is provided. The present invention is applicable to systems that include one or more macrocell base stations (mBSs), utilizing one or more frequency bands, and one or more femtocell BSs (fBSs). For example, a WiMAX system may operate at the 2.3 GHz band, the 2.5 GHz band, or both. The frequency bands may either be paired (as in FDD[1] system) or unpaired (as in TDD[2] system).

[1] Frequency Division Duplex
[2] Time Division Duplex Each frequency band may include one or more frequency assignments. For example, the 2.3 GHz band for WiMAX may have a spectrum of 10 MHz having one frequency assignment of 10 MHz channel bandwidth. Alternatively, the spectrum may comprise 30 MHz having three frequency assignments, each of 10 MHz channel bandwidth. Each mBS is associated with at least one frequency assignment in the frequency band. In an OFDMA system, each frequency assignment includes a number of subcarriers, which may be grouped for resource allocation convenience as "subchannels," "resource blocks," "resource tiles," or other configuration units.

According to one embodiment of the present invention, to avoid co-channel interference (CCI) to the macrocell, the frequency bands and the frequency assignments that are allocated to nearby mBSs are not used. When a frequency assignment in a frequency band is selected for an fBS's operation, CCI is further mitigated by (a) not using subcarriers and subchannels that are used by users who are located nearby to the femtocell, and (b) canceling CCI from the macrocell by applying joint demodulation. The present invention provides a method to determine the frequency band and the frequency assignments that are used by a nearby mBS. Also, the present invention provides a method to determine the subchannels that are used by nearby users, given a specific frequency assignment.

According to another aspect of the present invention, a method for efficiently combining spectrum sensing and scheduling information at a femtocell is introduced. The proposed invention applies both to orthogonal frequency division multiple access (OFDMA) and single-carrier frequency division multiple access (SC-FDMA) systems The present invention is better understood upon consideration of the detailed description below and the accompanying drawings.

DETAILED DESCRIPTION OF THE PREFERRED EMBODIMENTS

Femtocells are cellular networks with a range that is as limited as a wireless local area network (WLAN). Therefore, multiple femtocells may operate within the coverage area of an macrocell BS (mBS). Both the macrocell and the femtocells may use, for example, OFDMA as the physical layer technology. In this detailed description, to simplify the discussion, femtocells are assumed operated by the same service provider (SP) as the macrocell network, and utilizes the same spectrum as the macrocell.

According to the present invention, a femtocell BS (fBS) first determines whether it can communicate with a macrocell network. If the fBS is not connected to the macrocell network, the fBS may limit its operation to a subset of its capabilities. For example, the fBS may only performs spectrum sensing, but does not serve any femtocell MS (fMS), so as to prevent interference in the macrocell network caused by the fMS. Otherwise (i.e., the femtocell is connected to the macrocell), the fBS performs the following femtocell operations: (a) during the operation, information is exchanged over the connection between the fBS and the macrocell network, and (b) coordinated operations between the fBS and the macrocell BSs (mBSs). For example, the fBS may retrieve from the macrocell network information on the candidate frequency bands and frequency assignments at the locality where the femtocell intends to operate. Also, spectrum sensing results may be delivered to the macrocell network to allow the mBSs to assist in finding and creating spectrum opportunities.

Figure 1:
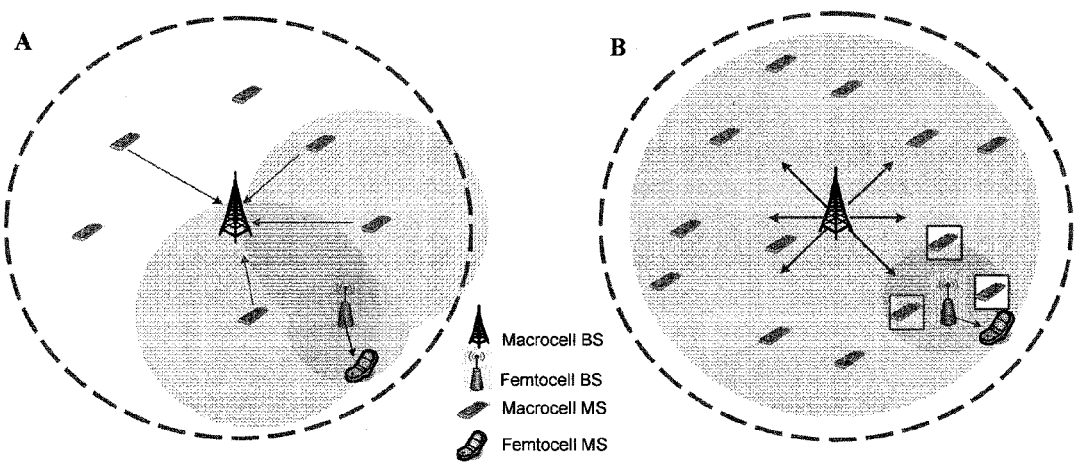
FIG. 1 provides exemplary macrocell network 100, in accordance with one embodiment of the present invention.

The present invention provides a whole system solution that enables an OFDMA-based femtocell to operate within the same spectrum as the macrocell network. FIG. 1 provides exemplary macrocell network 100, in accordance with one embodiment of the present invention. As shown in FIG. 1, in the uplink (UL), all macrocell users (e.g., users 101-1, . . . , 101-n) transmit their signals to the mBS 102. In the downlink (DL), mBS 102 transmits its signal to the macrocell users. Femtocell network 103 operates within macrocell network 100. As an example, macrocell network 100 may be a wireless network based on the IEEE 802.16 standard, where DL-MAP and UL-MAP messages embed scheduling information. Extensions of such a system to a different network with a different scheduling mechanism are known to those skilled in the art.

As long as the fBS is in the coverage area of the mBS, the fBS can sense a DL signal, which is a broadcast signal from the mBS that carries control information (e.g., subchannel scheduling information) to all macrocell users. If the femtocell avoids all subchannels that are occupied in the DL signal and uses only the unused subchannels, femtocell communication would be limited to a very narrow spectrum. Therefore, the fBS preferably determines the subchannels that are used by macrocell users who are nearby, so as to take advantage of the DL subchannels that are not used by these nearby macrocell users. For this purpose, the fBS seeks to obtain both downlink and uplink scheduling information (e.g., UL-MAP and DL-MAP in a WiMAX system, and scheduling messages in the control channel of LTE). In this detailed description, the present invention is described with reference to the WiMAX TDD system, in which the scheduling information may be obtained by demodulating and decoding the over-the-air scheduling information (i.e., from the DL signal received from an mBS) or by communicating with an mBS, for example, through a backhaul or internet connection. The fBS also accomplishes the following steps: (a) during a macrocell UL, determining the occupied UL subchannels via spectrum sensing and using the UL-MAP; (b) because the UL-MAP contains the information regarding the mapping of subchannels to users, determining from the occupied subchannels the users whose signals are received; (c) for each of the occupied subchannels, measuring the average signal power to estimate the distance from the corresponding macrocell user (i.e., to identify the nearby macrocell users); and (e) obtaining from the DL-MAP the DL subchannels that are assigned to the identified nearby macrocell users.

Once the DL subcarriers of nearby macrocell users are determined, the fBS avoids using these subcarriers so as not to cause interference during macrocell DL. During macrocell UL, by avoiding the occupied UL subcarriers that are sensed, femtocell communications may be conducted relatively interference-free.

If the communication between the fBS and the mBS is not available or is not appropriate for scheduling information exchange, fBS may obtain the UL-MAP and DL-MAP over-the-air by (a) demodulating and decoding the DL-MAP from the DL signal, or (b) demodulating and decoding the information packets in the DL signal that determine the UL subcarrier allocations. Because the packets for UL subcarrier allocations are usually sent only when a user becomes active, a user leaves the system, or when there is a change in the demand for UL spectrum, the fBS may be required to read DL-MAPs of consecutive frames before a complete UL-MAP is obtained. Such a condition leads to a prolong wait before femtocell communication may begin.

Figure 2:
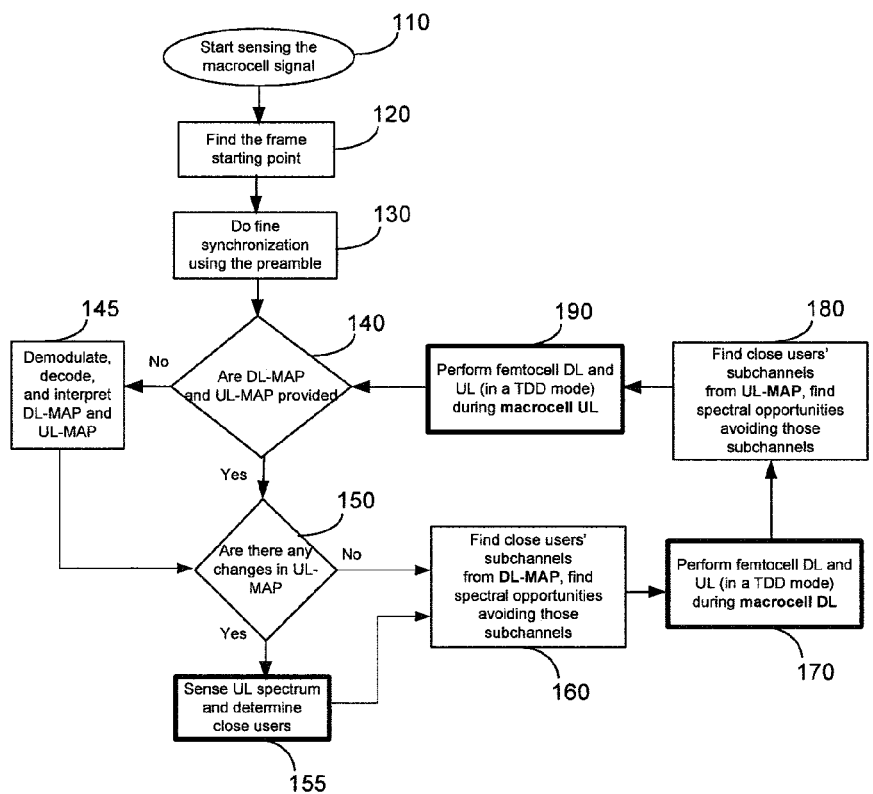
FIG. 2 is a flow chart that illustrates a framework for the coexistence of the femtocell network with a macrocell network, in accordance with the present invention.

FIG. 2 is a flow chart that illustrates a framework for the coexistence of the femtocell network with a macrocell network. As shown in FIG. 2, at step 110, an fBS begins to sense the macrocell signal. Synchronization with the received signal is achieved by finding the frame starting point (step 120) and refining synchronization using the preamble in the received signal (step 130). If the DL-MAP or UL-MAP information is available to the femtocell through a backbone network (decision point 140), such information may be utilized directly. Alternatively, if the DL-MAP or UL-MAP information is not available from the backbone network (decision point 140), the UL-MAP or DL-MAP may be obtained by demodulating and interpreting the received signal at step 145. If the UL-map information has changed from the last UL-map information received (decision point 150), the UL spectrum is scanned to update the list of nearby users (step 155). To identify nearby users of the macrocell, an energy detector with a simple thresholding algorithm may be utilized. Otherwise, the existing list of nearby users may be used.

Based on the current list of known nearby users, the subchannels allocated to these nearby users are identified from the DL-map and spectrum opportunities avoiding these subchannels are identified (step 160). Spectrum opportunities may be frequency bands, frequency assignments in a frequency band, or sub-carriers or subchannels within a specific frequency assignment in a frequency band. Femtocell DL and UL operations are carried out using these spectrum opportunities during the macrocell's DL (step 170).

Similarly, based on the current list of nearby users, the subchannels allocated to these nearby users are identified from the UL-map, and spectrum opportunities avoiding these subchannels are identified (step 180). Femtocell DL and UL operations are carried out using these spectrum opportunities during the macrocell's UL (step 190). Note that DL-MAP and UL-MAP information is not encrypted and can be accessed by the fBS. The details of the spectrum sensing and interference management are explained in more detail below.

To find spectrum opportunities in frequency bands and frequency assignments, DL transmissions from neighboring mBSs are measured. When information regarding candidate frequency bands and frequency assignments are provided by communication with the macrocell network, or retrieved from an internal memory that stores such information, the measurement efforts need be limited only to those candidate frequency bands and frequency assignments, rather than blindly searching all frequency bands and frequency assignments. In an FDD system, the DL portion of the paired spectrum is measured, while in a TDD system the DL subframe of the TDD frame is measured. According to the measurement, the fBS determines the frequency band and the frequency assignment that result in the least amount of interference in the received DL signals. This least interference frequency band and frequency assignment are then adopted for the fBS's operation.

Similarly, to find the spectrum opportunities in subcarriers or subchannels, spectrum sensing for UL transmission is performed. In an FDD system, the UL portion of the paired spectrum is measured, while in TDD system the uplink (UL) subframe of the macrocell network is measured. The frequency band and frequency assignment that result in the least interference are then adopted for the fBS's operation.

The fBS then informs the femtocell MSs (fMSs) the adopted subchannels or subcarriers to be used. If an fMS is capable of spectrum sensing, its sensing results may be provided to the fBS, to assist the fBS in its discovery of spectrum opportunities. The available subchannels can be utilized by fBS and fMS until the next sensing cycle.

Figure 3:
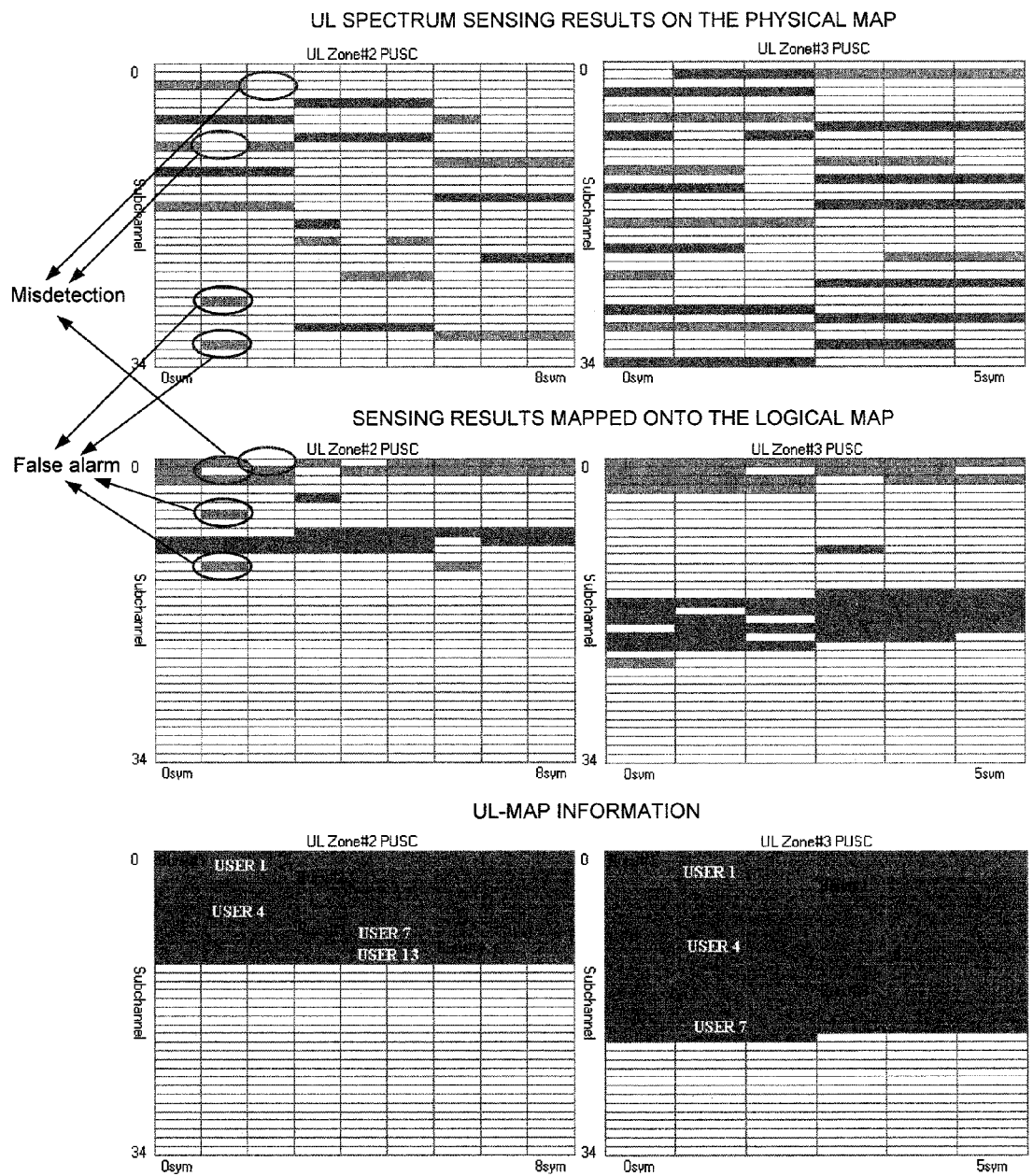
FIG. 3 illustrates sensing of the UL macrocell spectrum to find the nearby macrocell users and their subchannels.

FIG. 3 illustrates sensing of the UL macrocell spectrum to find the nearby macrocell users and their subchannels. As shown in FIG. 3, spectrum sensing results obtained for two separate UL zones are provided on physical map 300. The occupied subcarriers may be found from procedures such as, for example, energy detection from a Fourier transform of the received signal. The spectrum sensing results are then transferred to logical map 330. In this step, the spectrum sensing results are compared with the mBS's scheduling decision, which can be obtained through over-the-air signaling from the mBS or through a backhaul communication channel between the fBS and the mBS. To demodulate and decode over-the-air signaling, the femtocell is tuned to the mBS's DL transmission during the mBS's scheduling decision information transmission (in a WiMAX implementation, scheduling decision information is transmitted as UL-MAP and DL-MAP). The fBS may send spectrum sensing results to the mBS via a backhaul communication link, so as to allow the mBS to compare its scheduling decision with the spectrum sensing results.

As shown in FIG. 3, matching logical map 330 with the UL-MAP information finds the subchannels that are allocated to User 1 and User 7 are occupied, thus indicating that these two users are physically close to the measuring fBS. The mismatches between the sensing results and the UL-MAP are mainly caused by misdetections and false alarms. Also, note that a user may not use all his allocated subchannels, so that some mismatch may result from these unused allocated subchannels.

Figure 4:
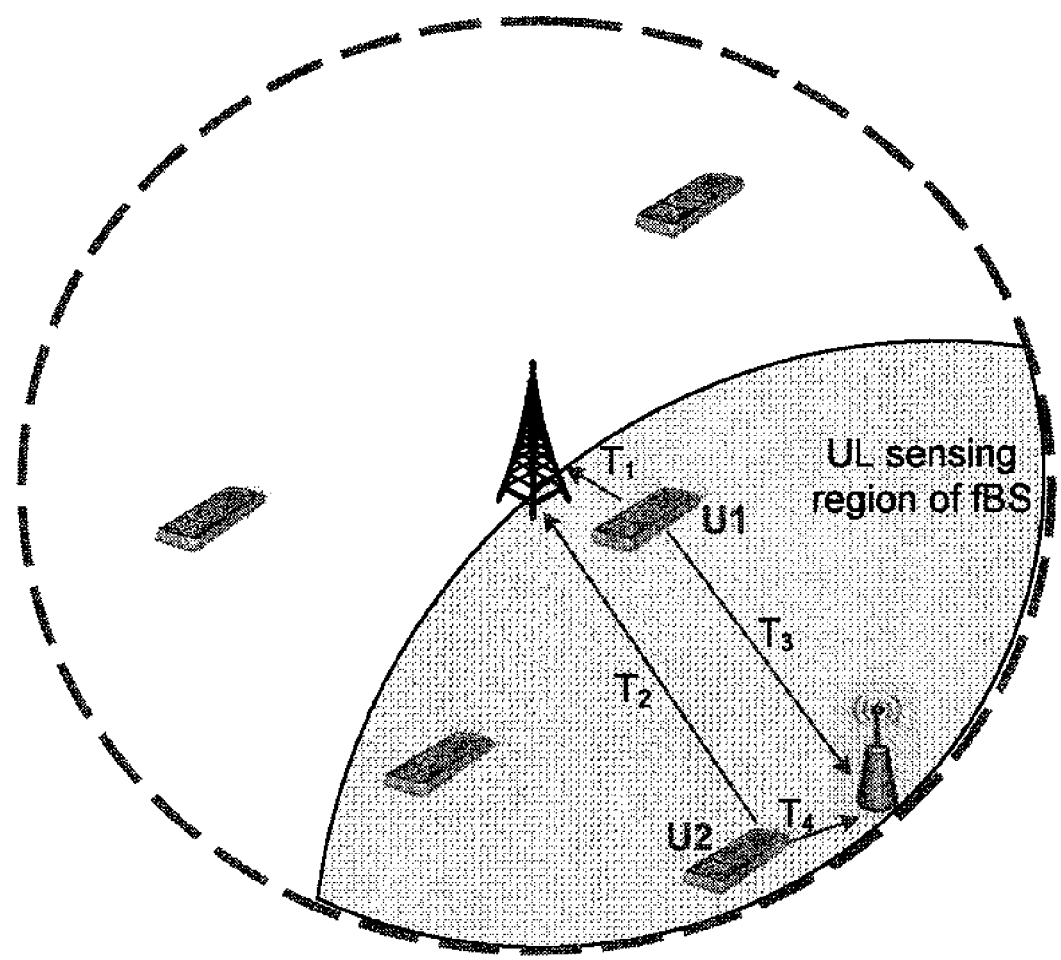
FIG. 4 illustrates the maximum delay that can exist between the user signals that arrive at fBS 402, which is at the border of macrocell 401.

In OFDMA signaling, an UL symbol received at the mBS is a combination of signals from multiple users, whose locations are spread throughout the macrocell, so that their signals arrive at the mBS with different delays. An mBS may apply ranging to reduce the difference delay, for example. Ranging requires that the farthest user from the mBS transmit its signal first, and the closest user to the mBS transmit last. However, since the location of the fBS may be anywhere inside the macrocell, the macrocell users' signals arrive substantially asynchronously at the fBS. An fBS that is far away from an mBS experiences a wide delay spread. FIG. 4 illustrates the maximum delay that can exist between the user signals that arrive at fBS 402, which is at the border of macrocell 401. In FIG. 4, the transit times of user U1's and user U2's signals to the mBS are $T_1$ and $T_2$, respectively. Therefore, after the mBS accomplishes ranging, user U1 transmits $T_2-T_1$ seconds later than user U2. Consequently, at the fBS, user U1's signal arrives $(T_2-T_1)+T_3-T_4$ seconds later than U2's signal. When user U1 is close to the mBS and user U2 is close to the fBS, $T_1$ and $T_4$ are substantially zero, and $T_3$ substantially equals $T_2$, so that the maximum delay $T_{max}$ faced by the fBS is substantially $2T_2$. Assuming an average macrocell radius of 5 miles (8.046 km), this maximum delay $T_{max}$ is given by:

$$T_{max} = 2 \times \frac{8.046 \times 10^3}{300 \times 10^6} = 53.64 \text{ μs}$$

Assuming a symbol duration of approximately 0.1 ms and a cyclic prefix (CP) length of ⅛, then a CP duration of 12.5 μs is typical, which is much less than $T_{max}$. One concern is, therefore, whether or not the UL spectrum may be reliably sensed by simply using energy detection of a Fourier transform in view of a large $T_{max}$. Simulations in realistic environments for OFDMA systems show that using even a simple energy detection approach, misdetection and false alarm rates remain acceptable, especially for an SNR values above 0 dB.

Figure 5:
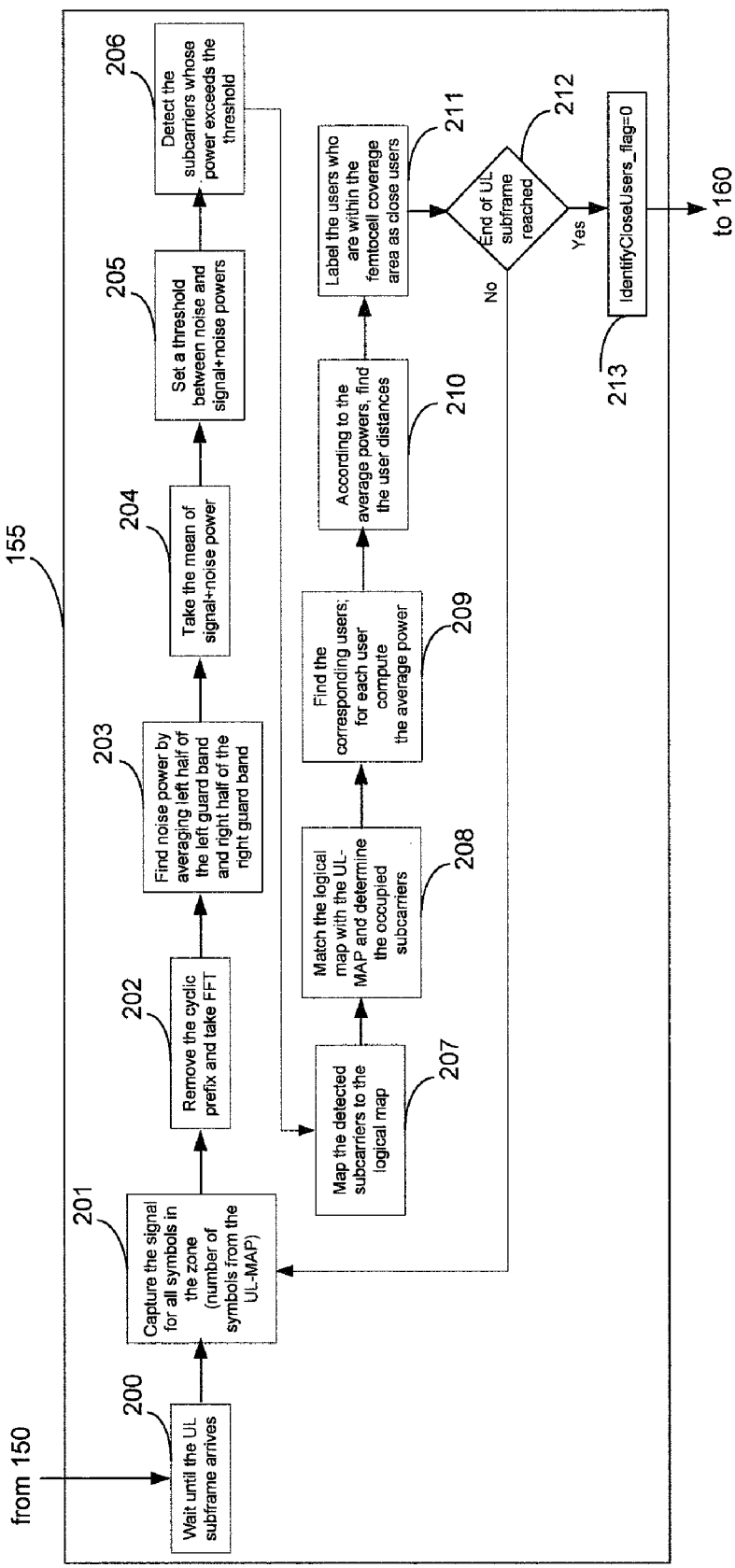
FIG. 5 is a flow chart that illustrates detecting spectrum opportunities using an energy detector and a thresholding mechanism, according to one embodiment of the present invention.

FIG. 5 is a flow chart that illustrates detecting spectrum opportunities using an energy detector and a thresholding mechanism, according to one embodiment of the present invention. As shown in FIG. 5, when an UL signal subframe from different macrocell users with different timing offsets arrive at the fBS (step 200), the fBS captures the symbols within the UL signal frame based on the UL-MAP (step 201), removes the CP and takes the FFT of the resulting signal (step 202), and finds the noise power at step 203. A suitable thresholding mechanism may then be applied. One example of a threshold mechanism selects at step 205 a threshold value between the average signal and noise power (e.g., computed at step 204) and the noise power. The selected threshold value is applied on each received power of the subcarriers (step 206). A normalized thresholding method may be used to determine the suitable threshold value:

$$T_p = P_n + T_{norm}(P_n + P_{s+n})$$

where $T_p$ denotes the threshold value to be used to distinguish noise signals from useful signals, $P_n$ is the noise power, $P_{s+n}$ is the mean signal plus noise power, and $0 < T_{norm} < 1$ is a normalized threshold factor, which is a design parameter. If $T_{norm}$ is set too high, only the spectrum of users who are very close to the fBS can be identified, which suggests that a higher interference between the macrocell network and the femtocell network may be expected. Alternatively, if $T_{norm}$ is set too low, the femtocell network is conservative in accessing spectrum opportunities, so that some of the unused subcarriers may be missed. A typical value for $T_{norm}$ may be 0.05. Other thresholding mechanism may also be used within the scope of the present invention. For example, an alternative to determining $P_{s+n}$ in step 204 may be achieved using a simple clustering algorithm which removes roughly a noise-only region, and calculates a mean power based only on the useful signals. In another implementation, the threshold value can be set based only on the noise level $P_n$ (i.e., without considering $P_{s+n}$), and designed to achieve an acceptable predetermined probability of false alarm.

After spectrum sensing, a procedure that uses UL-MAP information to identify nearby macrocell users within the coverage area of fBS (e.g., the procedure illustrated above in conjunction with FIG. 3) may be used, such as illustrated by steps 201-213.

Figure 6:
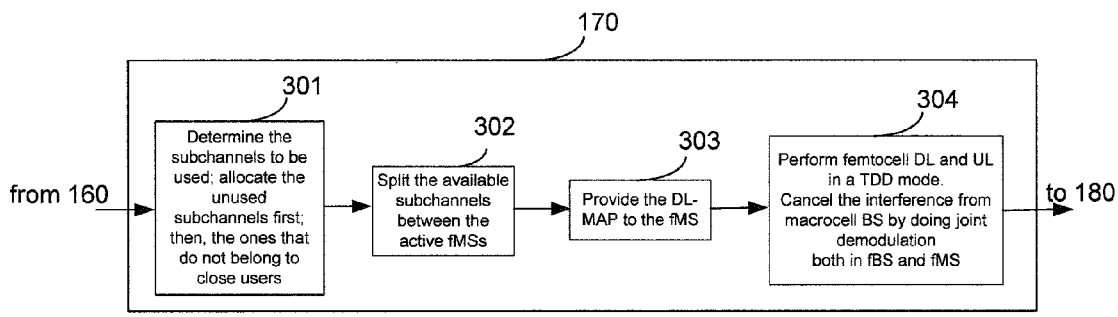
FIG. 6 is a flow chart that illustrates femtocell communication that is conducted during a macrocell DL frame, according to one embodiment of the present invention.

The potential co-channel interference (CCI) that occurs between the macrocell network and the femtocell network is preferably avoided or cancelled in the most efficient way, so that co-existence of the macrocell network and the femtocell networks in the same spectrum are possible. FIG. 6 illustrates femtocell communication that is conducted during a macrocell DL frame. As shown in FIG. 6, at step 301, the sub-channels available to the femtocells are identified. Such sub-channels included sub-channels unused by the macrocells and sub-channels allocated by the macrocells to users that are not nearby to the femtocell. The unused sub-channels are allocated first by the fBS for use by the fMSs. Thereafter, if additional sub-channels are required, the fBS allocates the sub-channels that the macrocell allocated to non-nearby users. At step 302, the available sub-channels are assigned to the fMS's. At step 303, the fBS provides each fMS with a DL-MAP for the femtocell. At step 304, the femtocell UL and DL operations are performed utilizing the allocated subchannels.

During transmission of the macrocell DL subframe, the fBS performs CCI avoidance. Typically, a macrocell in an OFDMA-based system has a high DL usage percentage with a large number of users. However, in any femtocell, the number of users that are nearby to the fBS is limited. Hence, interference from the femtocell to the macrocell can be avoided by not using the subchannels that are allocated by the mBS to nearby users, which typically corresponds to a relatively limited spectrum that needs to be avoided. Therefore, significant spectrum opportunities exist for femtocells during transmission of a macrocell DL subframe, so long as nearby macrocell users are accurately identified.

For a femtocell within the coverage of a macrocell, interference from signals transmitted from the mBS is unavoidable, because many of the subchannels that are not avoided by the femtocell are in fact used by the macrocell for transmission. Therefore, CCI cancellation is needed in both the fBS and the fMS's. Joint demodulation is one method to reduce CCI, especially when a single interferer (i.e., the mBS) affects the received signal. In a cellular system, when there are N dominant co-channel interferers present that may interfere with a desired signal, the desired signal can be recovered by joint demodulation, ideally, using a minimum number of N+1 receiver antennas to provide N+1 independent copies of each transmitted signal and to provide the channel information between each transmitter-receiver pair. At a transceiver with a single antenna, joint modulation may still be used to resolve the signals transmitted by the N+1 sources, provided that time and frequency can be synchronized within tolerable limits and a reliable channel estimate is available for each channel resolved.

In an OFDMA-based femtocell implementation, to perform joint demodulation, the femtocell signal (i.e., the desired signal) and the macrocell signal (i.e., the source of CCI) are assumed capable of being synchronized and the corresponding channel estimates are assumed to be available. Under such conditions, in this 2-transmitter case, there are a number of possible IQ signal pairs $[x_1, x_2]$ at every subcarrier, where $x_1$ represents the signal from the first transmitter and $x_2$ represents the signal from the second transmitter. In single-antenna joint demodulation, these possible IQ signal pairs are each considered a hypothesis. Each hypothesis may be simulated by applying the estimated channel responses, and the best hypothesis is determined by calculating the corresponding Euclidian distance as follows $$e(k)=|Y(k)-H_1(k)x_1-H_2(k)x_2|^2,$$

where $Y(k)$ is the received signal, $x_1$ and $x_2$ are the two signals that constitute the hypothesis, and $H_1(k)$ and $H_2(k)$ are the corresponding channel estimates. The minimum $e(k)$ value is expected to belong to the desired $[x_1, x_2]$ signal pair for the subcarrier in question.

In the joint demodulation method described above, for the case of two signal sources each transmitting a QPSK-modulated signal, there are $4^2$ hypotheses for each received data subcarrier. Although this two-source, $4^{th}$ order-modulation case does not pose a particularly serious computational challenge, the complexity of joint demodulation, generally, is proportional to $N^k$, where N is the modulation order, and k is the number of signal sources. Therefore, for a greater number of interfering signal sources (e.g., multiple fBSs) using the same spectrum, each using a high-order modulation (e.g., 16), the computational complexity may limit to the practical application of single-antenna joint demodulation. Joint demodulation using multiple receiver antennas is preferred.

The advantages of joint demodulation include (a) low computational complexity; (b) limited interference power from mBS; (c) relatively straightforward synchronization; (d) when the DL-MAP is available, reduced complexity due to known modulation for each subcarrier.

As discussed above, to efficiently perform joint demodulation, the fMSs or fBS are required to reliably estimate the channels for both the fBS (or fMS) and the mBS. If the DL-MAP for the macrocell DL frame is available, the fBS is required to share the DL-MAP with the fMS to decrease the computational requirement.

Figure 7:
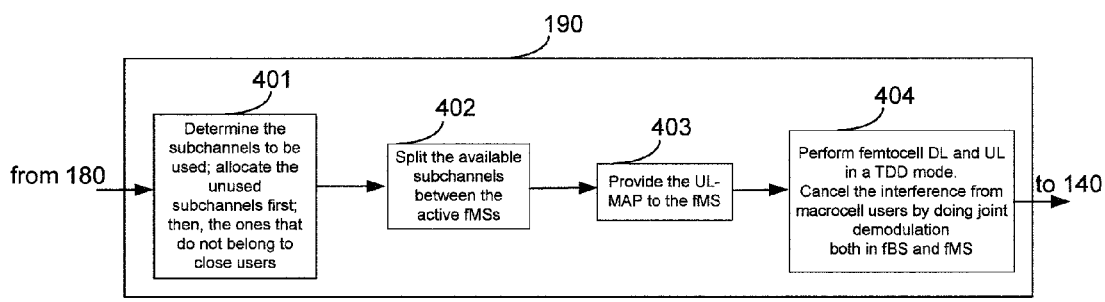
FIG. 7 is a flow chart that illustrates femtocell communication that is conducted during a macrocell UL frame, according to one embodiment of the present invention.

FIG. 7 is a flow chart that illustrates femtocell communication that is conducted during a macrocell UL frame. As shown in FIG. 7, at step 401, the sub-channels available to the femtocells are identified. Such sub-channels included sub-channels unused by the macrocells and sub-channels allocated by the macrocell to users that are not nearby to the femtocell. The unused sub-channels are allocated first by the fBS for use by the fMSs. Thereafter, if additional sub-channels are required, the fBS allocates the sub-channels that the macrocell allocated to non-nearby users. At step 402, the available sub-channels are assigned to the fMS's. At step 403, the fBS provides each fMS with an UL-MAP for the femtocell. At step 404, the femtocell UL and DL operations are performed utilizing the allocated subchannels.

Femtocell signals typically do not reach the mBS and cause interference. (If the femtocell is very close to the mBS, a femtocell would not be needed, as the mBS already provides a strong signal). To ensure macrocell communication quality, as in the DL frame, CCI avoidance can be achieved by not using the subchannels that are allocated to nearby macrocell users. As discussed above, none or limited interference of the macrocell network from the femtocell network is possible, so long as the nearby macrocell users are accurately identified.

During the macrocell UL frame, strong interference of femtocell signals is expected from nearby macrocell users. Hence, subchannels allocated to nearby users need to be avoided. Relatively limited interference occurs on the other subchannels. However, to ensure that this interference does not decrease the Quality-of-Service of femtocell communication, CCI cancellation is used in both the fBS and the fMS. As in CCI avoidance during the DL frame, joint demodulation may be used to cancel CCI. This approach is used when there is a single interferer on each subcarrier (e.g., a single macrocell user). When the macrocell UL-MAP is available, complexity decreases, as the signal modulation is known.

Joint demodulation, however, requires good synchronization, but UL synchronization is problematic for the femtocell, as estimating the delays of all users may be impractical or impossible. Poor synchronization may result in delays that exceed the cyclic prefix, thus leading to strong inter-carrier interference (ICI), large phase rotation and inter-symbol interference (ISI). The UL-MAP is necessary both to decrease the computational requirement and to identify, for each macrocell user, the subcarriers which require channel estimation.

Figure 8:
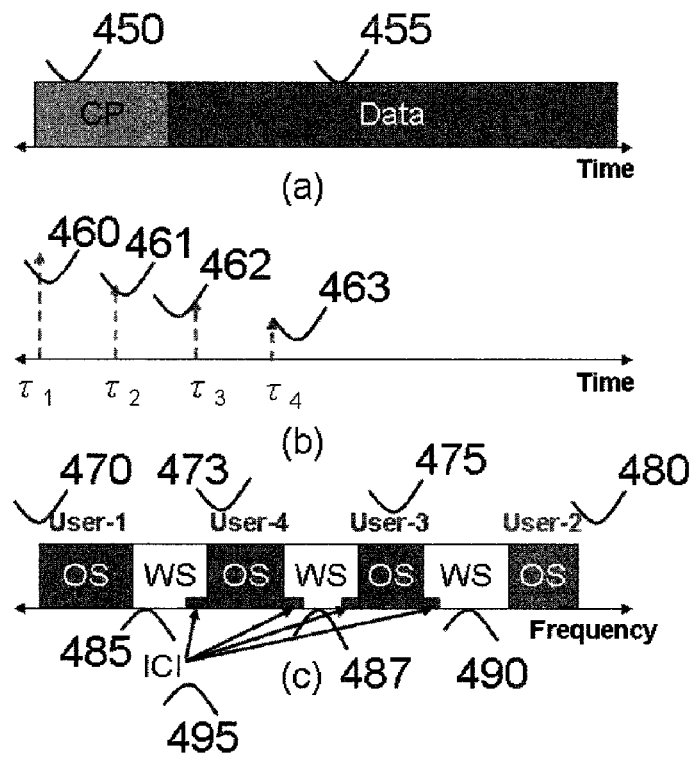
FIG. 8 illustrates inter-carrier-interference (ICI) in a femtocell, which occurs due to mMS signals arriving later than the CP of the uplink fMS signal at an fBS.

As described above, during the macrocell UL frame, all mMSs transmit their signals to the mBS, which are also received by an fBS. The fBS takes advantage of the received UL signals from mMSs efficiently to detect spectrum opportunities, and utilizes the opportunities for femtocell communication. Similar spectrum opportunities are identified by the femtocell for the macroecell DL frame. FIG. 8 illustrates inter-carrier-interference (ICI) in a femtocell. As shown in FIG. 8, a received symbol structure of a femtocell includes CP 450 and data portion 455. Correspondingly, the fBS detects four signal arrivals, at times 460, 461, 462 and 463, from mMSs User-1, User-2, User-3 and User-4, respectively. Specifically, the signals arriving at times 462 and 463 from mMSs User-3 and User-4, respectively, are later in time than CP 450 of the femtocell. As shown in FIG. 8, had the signals from the mMSs been synchronized with femtocell operations, ideally, white spectrum (WS) portions 485, 487 and 490 would be available completely for the femtocell's use during data period 455. However, because of the late arrival of mMS signals at 462 and 463, some of the subcarriers used by MSs User-3 and User-4 in spectrum portions 495, expected during CP period 450, becomes subject to ICI.

Figure 9:
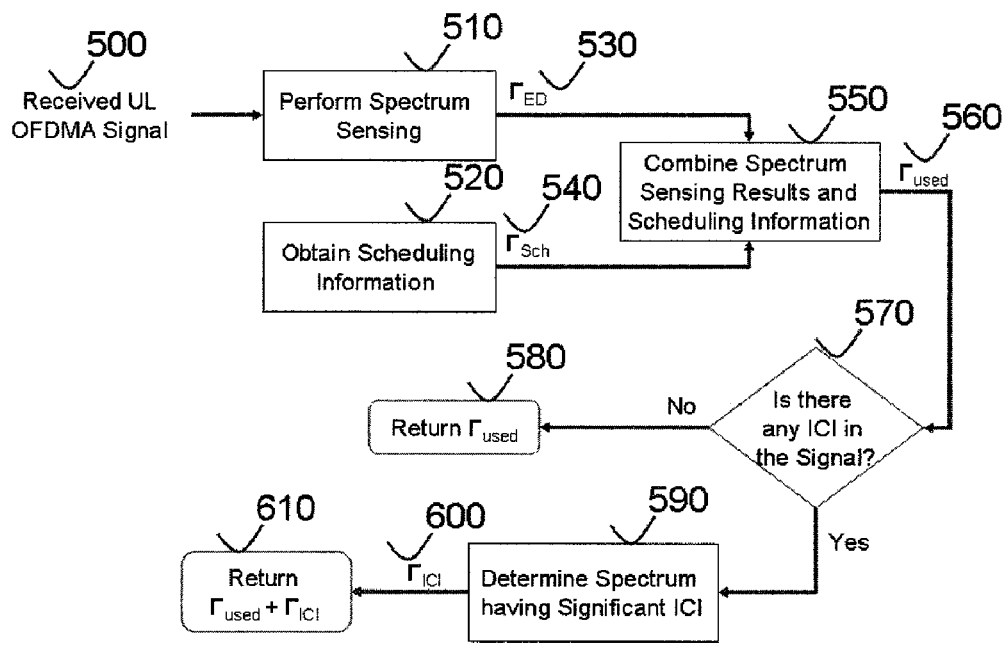
FIG. 9 is a flow chart of an efficient method that jointly combines spectrum sensing results and scheduling information to determine spectrum opportunities at a femtocell, according to one embodiment of the present invention.

As discussed above, UL spectrum sensing results and scheduling information may be utilized jointly at a femtocell to improve the spectrum sensing results. FIG. 9 is a flow chart of an efficient method that jointly combines spectrum sensing results and scheduling information to determine spectrum opportunities at a femtocell, in accordance with one embodiment of the present invention As shown in FIG. 9, received signal 500 is processed by, for example, an energy detector to perform spectrum sensing (step 510). Representing the frequency-domain received signal sample vector by $r_{rec}$, the output spectrum sensing vector $\Gamma_{ED}$ of the energy detector is given by:

$$\Gamma_{ED}=U(|r_{rec}|^2-\xi_{thrs}^{(ED)})$$

where $U(x)$ denotes the unit step function that individually applies to all the elements of a vector x, $|r_{rec}|^2$ is the vector whose elements are squared magnitude of corresponding elements of vector $r_{rec}$, $\xi_{thrs}^{(ED)}$ is a threshold value used for the spectrum sensing, and spectrum sensing vector $\Gamma_{ED}$ (indicated by reference numeral 530 in FIG. 9) is the output spectrum sensing vector having element values of '0's or '1's, where, if a received signal sample in $r_{rec}$ is larger than the corresponding threshold value in $\xi_{hrs}^{(ED)}$, the assigned value is '1' (the value is '0', otherwise). Another way to interpret output spectrum sensing vector $\xi_{ED}$ is as a vector in which an element value of '0' indicates that a corresponding subcarrier is available for use by the femtocell (even though it may actually be already allocated by the macrocell to another user), and an element value of '1' indicates that sensed energy (i.e., a potential interference level) at the corresponding subcarrier is strong, and thus cannot be used by the femtocell.

Noise and ICI may cause false alarms and missed detections, resulting in erroneous values in vector $\xi_{ED}$.

At step 520, the femtocell obtains macrocell UL scheduling information, which provides a mapping between mMSs to their allocated subcarriers (e.g., in WiMAX, through the UL-MAP message of a received DL signal, or in all cases, through a backbone connection to the macrocell). However, because some mMSs may not be nearby to the femtocell, their allocated UL spectra can still be utilized by the femtocell. Hence, local spectrum sensing information at a femtocell may be jointly utilized with—i.e., in conjunction with—the scheduling information at step 550. Representing the scheduling vector for a user-j as $\xi_{sch}^{(j)3}$, the decision vector $\Gamma_{used}$ for occupied subcarriers is given by:

$$\Gamma_{used} = \sum_{j=1}^{N_u} \left\{ U\left( \frac{<\Gamma_{ED}, \Gamma_{sch}^{(j)}>}{\|\Gamma_{sch}^{(j)}\|} - \xi_{jnt} \right) \right\} \times \Gamma_{sch}^{(j)}$$

where $N_u$ denotes the number of UL users, $<x,y>$ denotes an inner product of vectors x and y, $\|x\|$ denotes the norm-2 of a vector x, and $\xi_{jnt}$ is a joint detection threshold. For example, a threshold value $\xi_{jnt}=0.5$ represents the criterion that at least half of the subcarriers from a scheduling vector $\Gamma_{sch}^{(j)}$ is sensed to be occupied through energy detection (represented by output spectrum sensing vector $\Gamma_{ED}$). Decision vector $\Gamma_{used}$ may be represented by a two-dimensional time-frequency grid. At step 570, if no ICI is detected in the received signal, decision vector $\Gamma_{used}$ provides subcarriers that can be used for the femtocell (step 580). Otherwise, the spectra that include significant ICI (i.e., ICI vector $\Gamma_{ICI}$, indicated by reference numeral 600) is determined at step 590. Both ICI vector $\Gamma_{ICI}$ and decision vector $\Gamma_{used}$ are provided to the femtocell (step 610).

[3] In vector $\Gamma_{sch}^{(j)}$, each element, which corresponds to a subcarrier, is either '0' or '1', with '1' indicating that the corresponding subcarrier is occupied by that $j^{th}$ user, and a '0' indicating that the corresponding subcarrier is not occupied In the presence of ICI, as discussed in conjunction with FIG. 8, subcarriers allocated to nearby users of a femtocell would experience strong interference. Based on the results of step 550, if the interference level experienced by mMS user-j is strong, the term U(.) in the equation for $\Gamma_{used}$ above provides:

$$U\left( \frac{<\Gamma_{ED}, \Gamma_{sch}^{(j)}>}{\|\Gamma_{sch}^{(j)}\|} - \xi_{jnt} \right) = 1,$$

which implies that, if that user-j's delay is larger than the femtocell signal's CP period, strong ICI in some subcarriers result. The set $\Pi_{int}$ is prepared which includes the macrocell users who satisfy the above equality.

Figure 10:
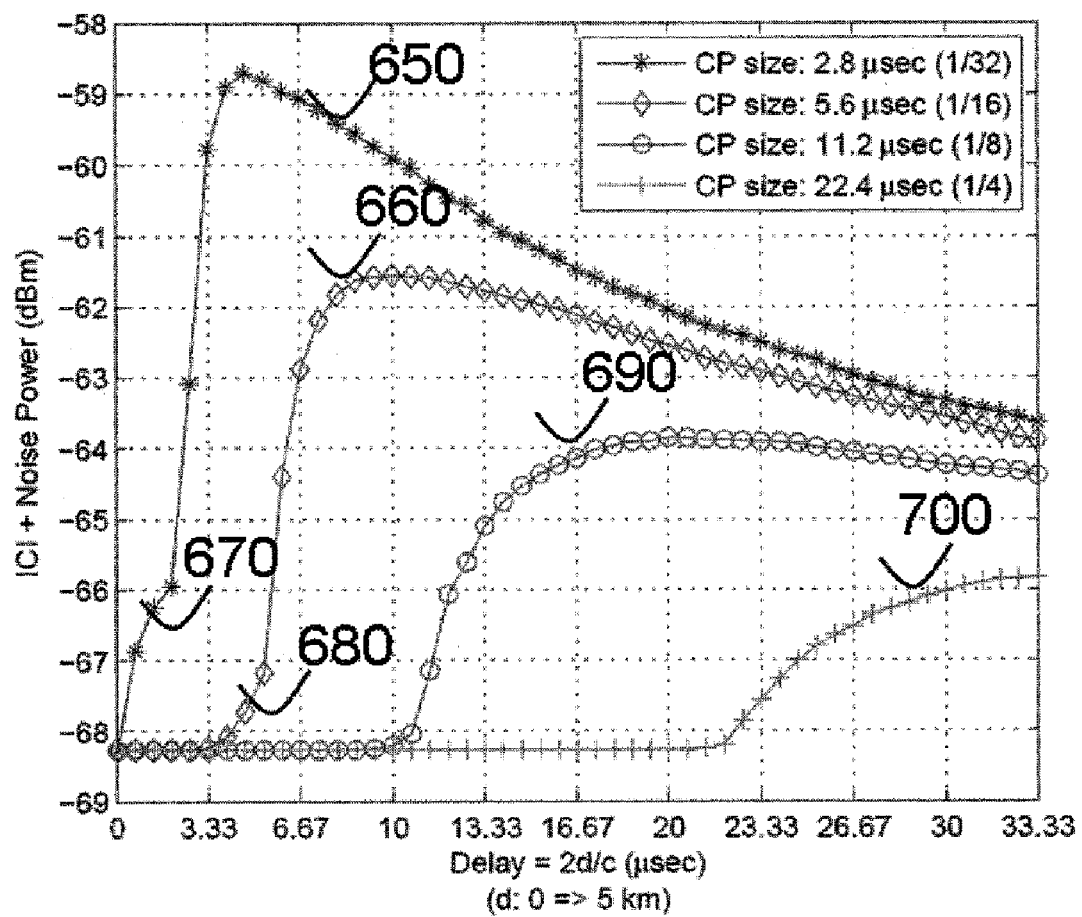
FIG. 10 shows simulation results that represent the impact of mMS-fBS distance (i.e., the signal arrival time) on the ICI for multipath channels, using 6-tap ITU-R Vehicular A Channel Model, with a maximum excess delay of 2.51 μsec, assuming a free-space path loss.

FIG. 10 shows simulation results that represent the impact of mMS-fBS distance (i.e., the signal arrival time) on the ICI for multipath channels, using 6-tap ITU-R Vehicular A Channel Model, with a maximum excess delay of 2.51 μsec and assuming a free-space path loss. In FIG. 10,[4] two UEs (e.g., two mMSs) are assumed to be both synchronized to an eNB (e.g., an mBS) and are positioned on the same line between the eNB, and the HeNB (e.g., an fBS), with one of the UEs being very close to the border of the femtocell, and the other UE moving towards the eNB. Because of the synchronization constraint to the eNB, the difference between the arrival times of the UE signals to the HeNB is given by 2d/c, where d is the distance between the two UEs and c is the speed of light. The symbol duration without any CP is taken as 89.6 μsec. FIG. 10 shows the ICI and noise power measured at the HeNB as a function of delay between the UE's, for various lengths of CP lengths. The effect of distance between the mMS and fBS on the interference is two-fold. First, a larger distance between an mMS and the fBS leads to a larger delay, and hence, a higher ICI. Second, the path loss from a larger distance is greater, so that the resulting interference diminishes with distance.

[4] In 3GPP terminology, the terms "HNB" and "NB" correspond to the terms "femtocell base station (fBS)" and "macrocell base station (mBS)," respectively, for 3G systems. In LTE terminology, the terms "HeNB" and "eNB" correspond to the terms "fBS" and "mBS," respectively, for 3G systems. The term "UE" ("user equipment") refers to the mobile stations ("mMS")

The simulation of FIG. 10 shows (a) the interference from an mMS signal is zero when the multipath components arrive within the CP of the femtocell signal; (b) the ICI increases once the signal arrival time exceeds the CP duration; (c) in a multipath channel, even if the first arriving path is within the CP length, some later arriving paths may be outside the CP, resulting in ICI; (d) due to attenuation, the ICI peaks and begins to decrease beyond a certain fBS-mMS distance; (e) in a multipath channel, ICI is not zero for CP=1/32, even for small distances (see, e.g., noise-delay points 670 and 680 corresponding to CP lengths 1/32 and 1/16, respectively), as the maximum excess delay is larger than the CP; and (f) for a larger CP length, ICI is always lower compared to a smaller CP length, regardless of the distance.

To detect subcarriers that are subject to strong ICI, the femtocell checks the neighboring subcarriers of users that experience significant ICI (i.e., members of the set $\Pi_{int}$) identified at step 590 of FIG. 9. Typically, ICI impacts only a few subcarriers within the neighborhood of a certain subcarrier. Let $N_{ICI}$ denote the number of subcarriers where ICI may be considered as dominant. Then, the set of subcarriers $\tilde{\Gamma}_{sch}(N_{ICI})$ that are to be checked for the presence of ICI is given by the following vector:

$$\tilde{\Gamma}_{sch}(N_{ICI}) = \sum_{j \in \Pi_{int}} \left( \text{sign}\left[ \sum_{k=-N_{ICI}}^{N_{ICI}} \mathcal{L}_{shift}(\Gamma_{sch}^{(j)}, k) \right] - \Gamma_{sch}^{(j)} \right)$$

where $\mathcal{L}_{shift}(x, k)$ is a logical right-shift operator which shifts the elements of a bit-vector x in k bit positions towards right, and sign(x) is a sign operator which operates individually on all the elements of a vector x. Once the subcarriers that may be subject to ICI are obtained in the vector $\tilde{\Gamma}_{sch}(N_{ICI})$, they are compared with the energy detection threshold $\xi_{thrs}^{(ED)}$ as follows $$\Gamma_{ICI} = U(\tilde{\Gamma}_{sch}(N_{ICI}) \otimes |r_{rec}|^2 - \xi_{thrs}^{(ED)})$$

where $\otimes$ indicates a term-by-term product. Then, the occupied subcarriers in the presence of ICI is given by $\Gamma_{ED}+\Gamma_{used}$ (identified at step 610). When information regarding the delays from mMSs are available, the set $\Pi_{int}$ may be obtained. The set $\Pi_{int}$ does not include mMSs whose delays are within the CP-length, as such mMSs do not cause significant ICI, except for the multipath components in the channels.

Figure 11:
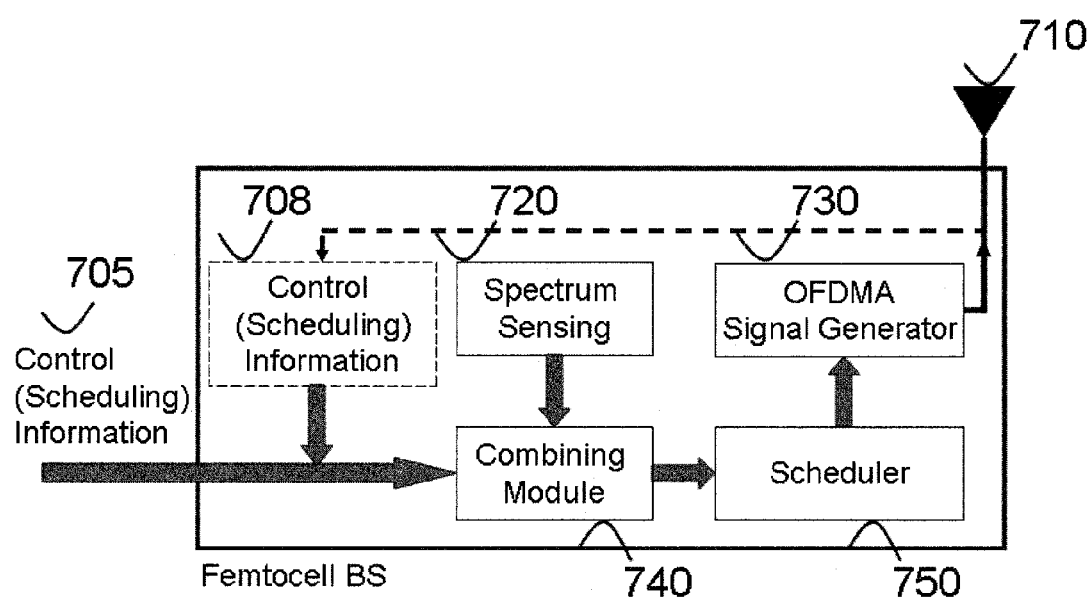
FIG. 11 shows an example on how a combining module of spectrum sensing and scheduling is utilized in a femtocell BS, in accordance with one embodiment of the present invention.

FIG. 11 shows an example on how a combining module of spectrum sensing and scheduling is utilized in a femtocell BS, in accordance with one embodiment of the present invention. As shown in FIG. 11, once spectrum sensing (step 720) completes at the femtocell BS, spectrum sensing results are combined in combining module 740 in the manner discussed above, for example, with scheduling information obtained over the air 708 (e.g., as in the UL-MAP of WiMAX systems) or, over a backbone connection 705. Combining module 740 provides the spectrum opportunities that can be utilized by the femtocell, which is communicated to scheduler 750 at the fBS. Scheduler 750 then schedules the subcarriers allocation (time and frequency) for the femtocells. The fBS then generates OFDMA signals based on this scheduling information from scheduler 730 and transmits the signals over antenna 710.

The detailed description above is provided to illustrate specific embodiments of the present invention and is not intended to be limiting. Numerous variations and modifications within the scope of the present invention are possible. The present invention is set forth in the following claims.

We claim:

1. A method for a femtocell located within a coverage area of a macrocell, comprising:
   receiving an uplink (UL) spectrum scheduling information from the macrocell, the UL spectrum scheduling information identifying occupied subcarriers within a plurality of UL subcarriers, the occupied subcarriers being assigned to mobile stations within the macrocell;
   at a femtocell base station, performing energy detection for UL transmissions in the occupied subcarriers;
   from the received UL spectrum scheduling information and the UL transmission energy detection, identifying a subset of the occupied subcarriers assigned to mobile stations within the macrocell that are within an interfering distance to the femtocell base station; and
   assigning subcarriers from the plurality of UL subcarriers that do not belong to the subset for UL transmissions from one or more femtocell mobile stations to the femtocell base station.

2. A method as in claim 1, wherein identifying the subset of subcarriers comprises determining signal powers for the UL transmissions from the energy detection and comparing the signal powers to a threshold.

3. A method as in claim 2, wherein the threshold is a normalized threshold calculated based on both the signal powers and a noise power.

4. A method as in claim 3, wherein the threshold value is further determined based on satisfying a certain false alarm rate.

5. A method as in claim 1, wherein both the femtocell and the macrocell operate OFDMA-based communication schemes.

6. A method as in claim 1, wherein both the femtocell and the macrocell operate SC-FDMA-based communication scheme.

7. A method as in claim 1, further comprising conducting communication between the femtocell and one or more femtocell mobile stations.

8. A method as in claim 7, further comprising performing joint demodulation of signals in the femtocell to cancel interference from the macrocell.

9. A method as in claim 8, wherein joint demodulation is performed in both a femtocell base station and the femtocell mobile stations.

10. A method as in claim 9, wherein the femtocell base station provides the femtocell mobile stations information from the received UL spectrum allocation map.

11. A method as in claim 8, wherein joint demodulation is based on a single-antenna model at the receiver.

12. A method as in claim 1, wherein the UL spectrum scheduling information is received from over-the-air transmission by a base station of the macrocell.

13. A method as in claim 1, wherein the UL spectrum scheduling information is received over a wide area network.

14. The method of claim 1, wherein the uplink (UL) spectrum scheduling information comprises an LTE scheduling message.

15. The method of claim 1, wherein the uplink (UL) spectrum scheduling information comprises an UL-MAP message.

16. The method of claim 1, further comprising:
   receiving downlink (DL) scheduling information from the macrocell, the DL scheduling information assigning subcarriers from a plurality of DL subcarriers;
   using the DL scheduling information, identifying a DL subset of DL subcarriers occupied by the mobile stations within the macrocell that are within an interfering distance to the femtocell base station; and
   assigning subcarriers from the plurality of DL subcarriers that do not belong to the DL subset for DL transmissions from the femtocell base station to the one or more femtocell mobile stations.

17. The method of claim 16, wherein the plurality of UL subcarriers is the same as the plurality of DL subcarriers.

18. The method of claim 16, wherein the plurality of UL subcarriers is distinct from the plurality of DL subcarriers.

* * * * *